(12) United States Patent
Cui et al.

(10) Patent No.: US 6,974,380 B2
(45) Date of Patent: Dec. 13, 2005

(54) LABORATORY AIR HANDLING UNIT

(76) Inventors: Yujie Cui, 909 S. 70th St., Apartment 22, Omaha, NE (US) 68106; Mingsheng Liu, 17569 "Y" St., Omaha, NE (US) 68135

( * ) Notice: Subject to any disclaimer, the term of this patent is extended or adjusted under 35 U.S.C. 154(b) by 249 days.

(21) Appl. No.: 10/275,127

(22) PCT Filed: May 1, 2001

(86) PCT No.: PCT/US01/13999

§ 371 (c)(1),
(2), (4) Date: Mar. 10, 2003

(87) PCT Pub. No.: WO01/84055

PCT Pub. Date: Nov. 8, 2001

(65) Prior Publication Data

US 2004/0242147 A1     Dec. 2, 2004

Related U.S. Application Data

(60) Provisional application No. 60/201,224, filed on May 1, 2000.

(51) Int. Cl.[7] ............................................. F24F 7/007
(52) U.S. Cl. ................... 454/229; 454/256; 126/299 F
(58) Field of Search ............................... 454/229, 228, 454/233, 236, 49, 56; 126/299 F, 299 R, 126/299 D

(56) References Cited

U.S. PATENT DOCUMENTS

| | | | |
|---|---|---|---|
| 4,125,062 A * | 11/1978 | Eakes ........................... | 454/56 |
| 4,160,407 A | 7/1979 | Duym | |
| 4,484,563 A * | 11/1984 | Fritz et al. ............... | 126/299 D |
| 4,497,242 A * | 2/1985 | Moyer ......................... | 454/61 |
| 4,773,311 A * | 9/1988 | Sharp ........................... | 454/56 |
| 4,917,862 A | 4/1990 | Kraw et al. | |
| 4,934,256 A | 6/1990 | Moss et al. | |
| 4,942,921 A * | 7/1990 | Haessig et al. ............. | 165/214 |
| 5,090,303 A | 2/1992 | Ahmed | |
| 5,115,728 A | 5/1992 | Ahmed et al. | |
| 5,170,673 A * | 12/1992 | Ahmed et al. ............. | 73/865.9 |
| 5,205,783 A | 4/1993 | Dieckert et al. | |
| 5,259,812 A * | 11/1993 | Kleinsek ....................... | 454/57 |
| 5,292,280 A * | 3/1994 | Janu et al. .................. | 454/229 |
| 5,312,297 A * | 5/1994 | Dieckert et al. ............ | 454/238 |
| 5,385,505 A | 1/1995 | Sharp et al. | |
| 5,636,993 A * | 6/1997 | Badry ......................... | 454/263 |
| 6,386,281 B1 * | 5/2002 | Ganesh et al. ............. | 165/298 |
| 6,609,967 B2 * | 8/2003 | Sharp et al. ................ | 454/236 |

* cited by examiner

*Primary Examiner*—Derek S. Boles
(74) *Attorney, Agent, or Firm*—Shook, Hardy & Bacon L.L.P.

(57) ABSTRACT

The invention is an air handling system that is shared between a laboratory and offices within the same building. The normally separate office and lab systems have been combined by way of an air return system that draws air from the offices and feeds into both the office and lab air supplies. The re-circulation of the office air draws more fresh outside air into and lessens requirements for the heating and cooling systems for the offices.

14 Claims, 2 Drawing Sheets

LABORATORY AIR HANDLING UNIT

This application claims the benefit of Provisional Application No. 60/201,224, filed May 1, 2000.

TECHNICAL FIELD

The present invention relates to air handling systems for buildings and more specifically for buildings with space allocated for both laboratory and general office use.

BACKGROUND

The ventilating systems for general purpose buildings typically comfort condition, and then recirculate most of the air within the building, only discharging a small percentage of the air to the outside environment. The ventilating objectives for a laboratory are very different. Because chemicals or biological substances employed in lab work often emit harmful or otherwise undesirable fumes, the ventilation system for a laboratory typically comfort conditions the air and then exhausts the air to the environment without any recirculation so that the fumes do not diffuse within the building. To enable technicians to experiment with fume emitting chemicals or biological substances while avoiding human contact therewith, one or more fume hoods are used. Fume hoods provide an area in which technicians can work without the risk of inhaling dangerous fumes. The work area is contained within a vacuum which draws and expels the toxic air from the lab to the outside of the building.

Special heating, ventilating, and cooling problems arise when a laboratory and offices share a common building. Currently, the laboratory and offices are served by separate air handling units. Separate units have been required because of the above-noted different ventilating objectives. But, the use of separate air handling units is inefficient and compromises office air quality.

Inefficiency is caused by the closed system requirements of the prior art laboratory air handler. Because the laboratory air handler is not allowed to recirculate air, 100% of the air is drawn from outside the building. In contrast, most office handling units draw only 10% of air from outside the building and recirculate the rest. Even though most of the outside air drawn by the laboratory air handling system will soon be exhausted due to the large air flow demands of the fume hood, all of the air must still be treated for comfort (i.e., cooled, dehumidified, warmed) so that the laboratory will be desirably environed. Consequently, the operating cost of the laboratory air handling unit can be 5 to 10 times more per floor area unit than that of the office air handling unit. Thus, the overall building efficiency is lowered.

Besides being inefficient, the prior art systems also compromise air quality in the office sections of the building. Fresh air is desirable in work environments. Prior art laboratory air handlers are required to draw 100% outside air for safety considerations, thus there are no stale air concerns. Prior art office air handling units, however, bring in 10% or less outside fresh air. Thus, in the prior art air handling systems, the laboratory ends up being fresh air "rich," and the office fresh air "poor."

Because of the above efficiency and air quality considerations, there is a need for an air handling system that would reduce the outside air treatment burden on the laboratory air handling system and at the same time deliver more outside air to the offices.

SUMMARY OF THE INVENTION

The present invention solves the above problems by using a Laboratory Air Handling Unit (LAHU), which is a common air handling system for both the laboratory and the offices, instead of the prior art separate systems. The LAHU design links the laboratory and office air handling systems with an air return system which draws air from the office and recirculates the air to both the laboratory and/or office air supply systems. The use of the return system serves to overcome the efficiency and office air quality problems associated with the separately operating prior art air handlers.

The foregoing and other advantages, features, and objects of this invention will become more apparent from the following detailed description which reference the accompanying drawings in which.

DETAILED DESCRIPTION

The prior art efficiency problems are overcome by an air return system. Outside air needs to be treated for comfort by the office supply system, whereas air returned from the office does not because it has already been treated. When the air flow in the laboratory is greater than that in the office (e.g., when a fume hood is in use), the return air from the office is mixed with outside air and used to modulate the air drawn into the laboratory to maintain a set-point. Because the laboratory fume hood air consumption needs are partially met by the mixed recirculated air from the office, less outside air is needed. Because less outside air is needed, the burden on the air treatment systems (i.e., heaters, preheaters, cooling coils) for the laboratory is greatly reduced. The reduction in air treating requirements for the laboratory system increases the overall efficiency of the building. Therefore, the LAHU eliminates the efficiency deficits created by the separate office/lab prior art systems by linking the two with a return air system.

The return air system also solves the prior art office air quality problems. The typical prior art office air handler draws 10% or less air from outside the building. However, the LAHU causes the office to draw in much more fresh air. More fresh air is drawn because the return air system, by evacuating air from the office to the more needy laboratory air handling system, creates an air volume deficit in the office which is satisfied by drawing in additional outside air. When the airflow of the laboratory section is lower than the airflow into the office section, the laboratory section receives 100% return air from the office section. Because the return system of the LAHU draws more fresh air into the office, the prior art air quality problems are eliminated.

Figure 1:
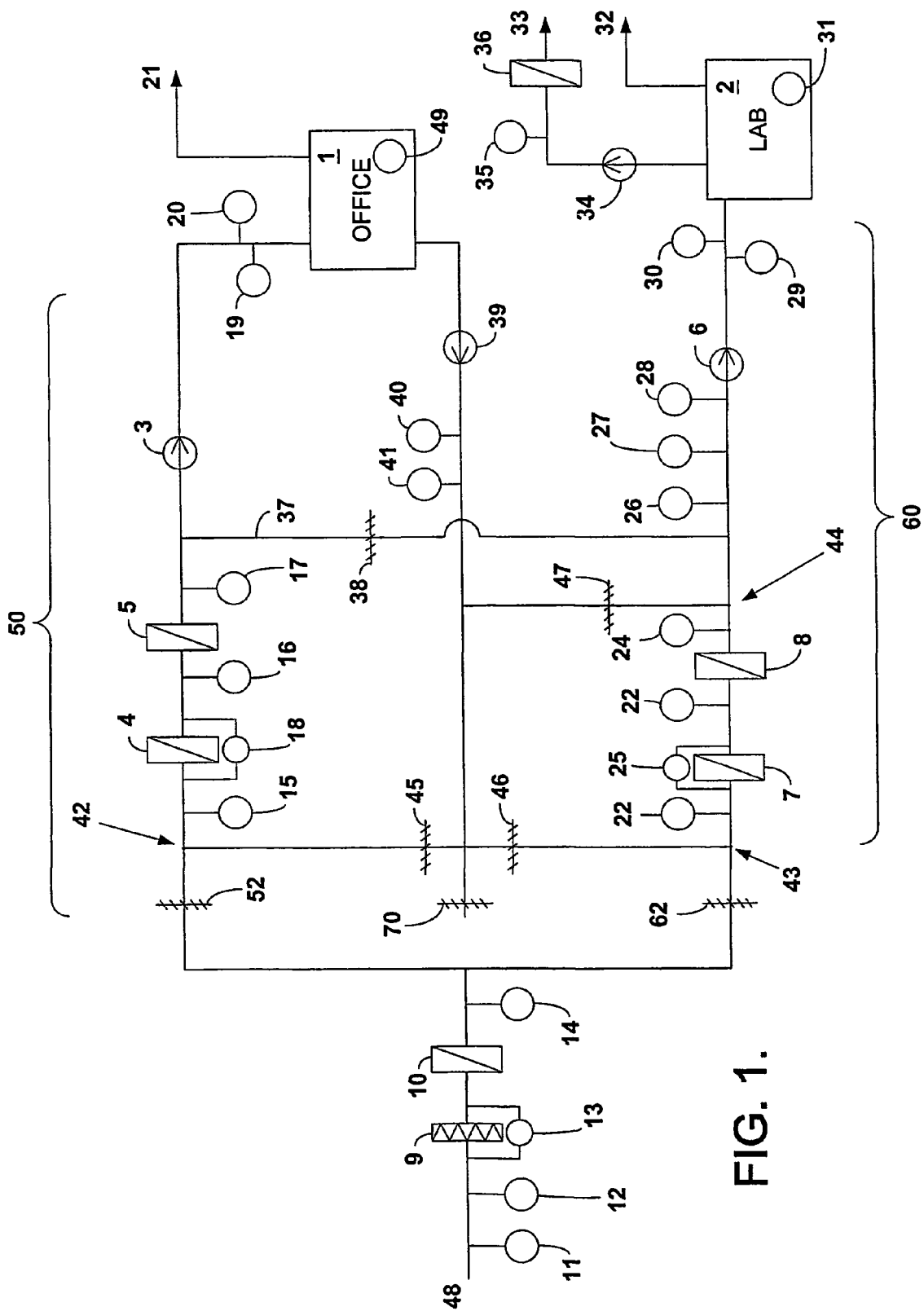
FIG. 1 is a schematic representation of the LAHU for a building containing both laboratory and office space.
Figure 2:
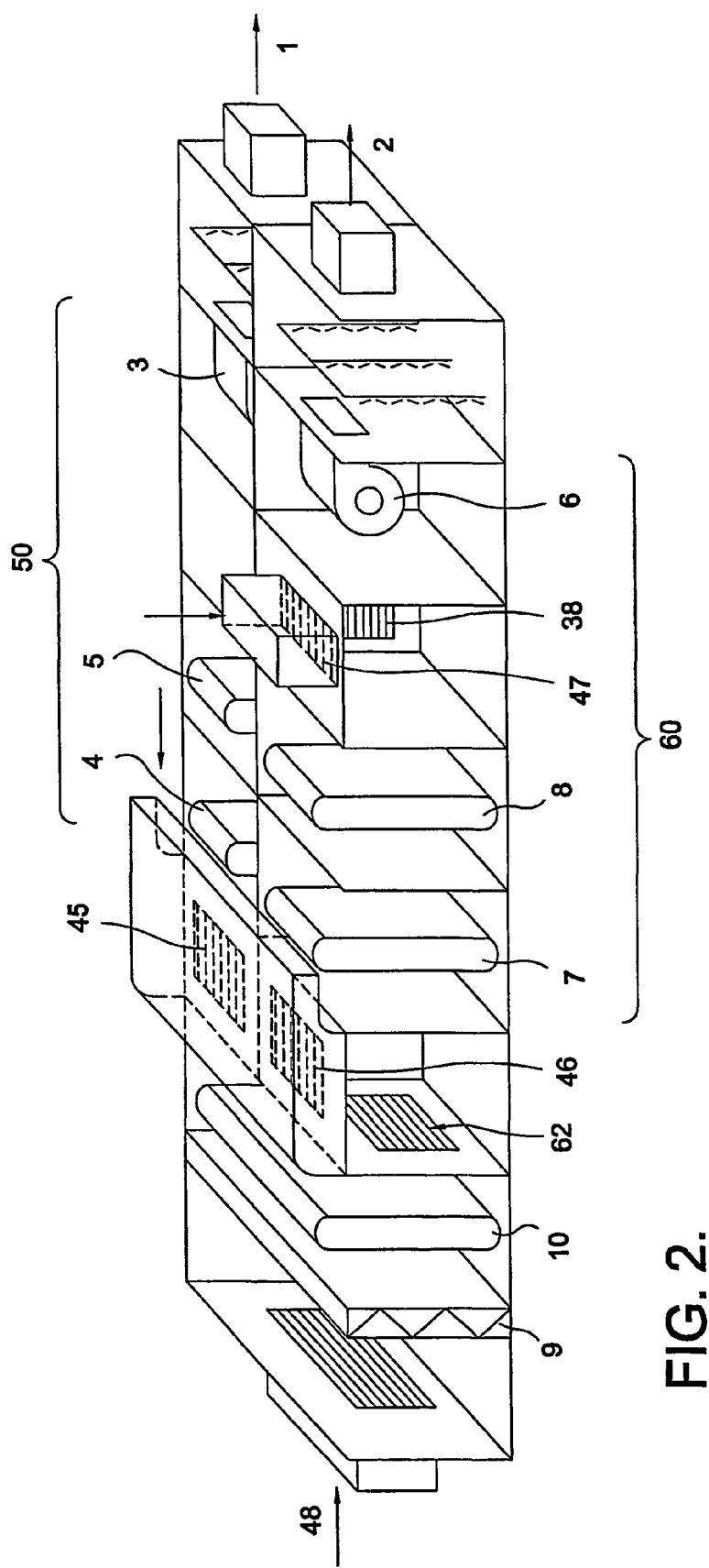
FIG. 2 is a structural representation of the LAHU.

Referring now to the drawings, schematic FIG. 1 and structural drawing FIG. 2 depict the LAHU a building according to the present invention. The building contains an office area 1 and a laboratory area 2. The office area 1 is served by an office supply system 50 and the laboratory 2 is served by a laboratory air supply system 60.

The building typically has a common outside air source 48. The outside air temperatures are measured by both an insertion-type-wet-bulb air temperature sensor 11 and an insertion-type-dry-bulb air temperature sensor 12 respectively. Before passing into the buildings heating, ventilating and cooling (HVAC) systems, the outside air passes through a filter 9 across which a pressure difference is measured by an air pressure differential sensor 13 in a manner known in the art. The air is then optionally acted on by a heat recovery unit 10 after which air temperature is sensed by a crossover-type-dry-bulb air temperature sensor 14. The building has only one outside air source 48.

Outside air 48 may be optionally be drawn by both the office supply system 50 and the laboratory supply system 60 if threshold vent 52 is open (as is typical when the system is in operation). The office supply system 50 has its own climate control system having both a preheating coils 4 and cooling coils 5. Temperature readings upstream and downstream of both sets of coils 4, 5 are recorded by three cross-over-type-air-temperature sensors 15, 16, 17 and used to control the preheater 4 and cooling coils 5 in a manner well known in the art. Pressure differences upstream and downstream of the preheating coils 4 are measured by a air pressure differential sensor 18 used to control the airflow through the preheating 4 and cooling coils 5. Further upstream of the climate control system, a fan 3 is used to direct air into the office area. Before entering the office area, temperature and pressure are sensed by an insertion-type-dry-bulb-air-temperature sensor 19 and pressure sensor 20 respectively. An insertion-type-dry-bulb-air-temperature sensor is also maintained within the office. The temperature sensors in the outside 19 and inside 49 the office cooperate with the preheating 4 and cooling coils 5 to maintain desirable temperatures in the office area 1. The pressure sensor is used to control fan 3 speed. Some of the air supplied to the office is exhausted naturally to outside the building in an uncontrolled manner 21.

The laboratory supply system 60 also has a threshold vent 52 and utilizes a climate control system functionally identical to that serving the office, having preheating coils 7, cooling coils 8, three cross-over-type-dry-bulb-air-temperature sensors 22, 23, 24, and a pressure differential sensor reading across the preheating coils 7. The laboratory supply system 60 also has a fan 6 to move the air into the laboratory. Immediately upstream of the fan 6 is a cross-over-type-air-temperature sensor 26, a carbon dioxide sensor 27, and an airflow-rate sensor 28. Downstream of the fan 6, the air pressure 29 and dry-bulb temperature 30 are sensed by sensors 29, 30 before the air is propelled into the laboratory 2 by the fan 6. The carbon dioxide sensor 27 is used to monitor system air freshness and regulate system ventilation to optimize the same. The fan 6 speed is variably controlled based on readings from the pressure sensor 29. An insertion-type-dry-bulb-air-temperature sensor 31 is also maintained in the laboratory 2. The temperature sensors outside 30 and inside 31 the office are used to control the laboratory preheating 7 and cooling coils 8 to maintain desirable temperatures in the laboratory 2. As with offices, the laboratory also naturally exhausts some air to the outside in an uncontrolled fashion 32. However, the laboratory also has one or more fume hoods 33 which can exhaust large quantities of air from the office when activated, and minimal air when the fume hood is not in use.

Fume hoods 33 may comprise a fan 34, temperature sensor 35, and heat recovery unit 36 in a manner known in the art. The use of the fume hood dramatically drops the pressure in the laboratory 2. This pressure drop is sensed by the pressure sensor immediately upstream of the laboratory 29 which electrically and mechanically causes the an increase in fan 6 speed. This dramatically increases the demands on the laboratory supply system 60 in terms of both air volume and climate control. Prior art systems handled these increased demands by merely drawing more air through the laboratory supply system threshold vent 62. However, the LAHU handles these increased demands by linking the office and laboratory systems to share the burden.

The LAHU office supply 50 and laboratory supply 60 systems are optionally linked by a vented duct 37 which joins the office and laboratory supply systems (when the vent 38 is open) between the climate controls and the office 3 and laboratory 6 supply air fans. This linkage allows the laboratory to draw treated air from both the office air supply system 50, thus reducing the burden on the laboratory preheating 7 and cooling 8 coils by transferring that burden to the office preheating 4 and cooling 5 coils.

The present invention also links the two systems by providing a return air system 39 which is capable of recirculating air from the office to both the office and laboratory supply systems. The return air system draws air from the office with a return air fan 39. The speeds of this fan are controlled using pressure and air flow rates as detected by pressure 40 and airflow 41 sensors immediately downstream from the fan in cooperation with the pressures sensed in the office 20 and the lab and the airflow measured into the lab by the other airflow sensor 28. This enables air to be drawn from the office to be recirculated to the laboratory air handling system 60. The return air system also contains a release vent to the outside 70.

The return air may be recirculated to three different system locations. First, the return air may be tapped into the office supply system upstream of the office climate control systems at junction 42 by opening a first vent 45. Second, the return air may be tapped into the laboratory supply system upstream of the laboratory climate controls at second junction 43 by opening a second vent 46. Finally, the return air may be tapped into the laboratory supply system immediately downstream of the laboratory climate controls at a third junction 44 by opening a third vent 47. The return air may be tapped in at one two or all three locations depending on whether particular vents are open or closed.

The opening of the first vent 45 only results in the LAHU operating in the manner of prior art handlers in that air is merely recirculated to the office. When either the second 46 or third vents 47 are opened, the air returned by the office is shared with the laboratory supply system causing the desired efficiency aspects of applicant's invention. Air admitted at the second junction 43 results in the return air mixing with the outside air drawn by the needy office air supply system 60 (when the fume hood 33 is open) upstream from the laboratory preheating 7 and cooling coils 8. Air admitted at the third junction 44 is mixed with air already treated. The air mixture at either point relieves much of the burden on the laboratory climate control systems because the temperature differential across the preheating 7 and cooling coils 8 will be reduced because the air upstream and downstream thereof is modulated by the return air. The second 46, third 47 or both vents should be open to create this desired effect.

This modulation by recirculation of the air by linking the office and laboratory systems dramatically increases the overall heating and cooling efficiency for the building. Outside air must be climate controlled, whereas air returned from the office does not because it has already been treated. Because air flow in the laboratory is greater than that in the office when a fume hood is in use, the second 46 and third 47 vents are normally opened and the return air from the office is mixed with outside air and used to modulate the air drawn into the laboratory to maintain a set-point. Because the laboratory fume hood air consumption needs are partially met by the mixed recirculated air from the office, less outside air is needed. Because less outside air 48 is needed, the burdens on the climate controls for the laboratory 7, 8 are greatly reduced. Because the reduction in burden on the laboratory climate controls 7, 8 is greater than the increased burden on the office climate controls 4, 5, overall building efficiency is increased. This improved efficiency has been shown to result in annual energy savings from $0.30 to $1.20 per square foot of floor area.

The return air system also provides exceptional air quality in the office. Typical prior art office air handlers draw 10% or less air from outside the building. However, the newly invented system causes the office to draw in much more fresh air. When a fume hood 33 is in operation, both threshold vents 52, 62 are open. Fresh air intake into the office air supply system is stepped up because some of the office return air is being drawn through second 46 and third 47 vents by the needy laboratory air handling system. The air that is recirculated from the office to the laboratory is replaced by fresh air from outside the building through the office air supply system 50 raising the fresh air percentage to well above the 10% prior art level. Likewise, when the airflow of the laboratory section is lower than the airflow into the office section, threshold vent 62 is closed and the laboratory section draws 100% of the return air from the office section. In either case, the result is the replacement of stale office air with fresh outside air up to several times more than is allowed by prior art systems.

In addition to optimizing efficiency and air quality, the newly invented air handler saves space and costs less to produce. Because it works more efficiently, cooling coils and preheating coils can be 20% smaller than for prior art systems. Further, some of its reheat coils can be eliminated because of the air return system. These structural reductions are doubly beneficial. First, they reduce the overall mechanical space required to house the air handler. The LAHU is 20% smaller than prior art air handling systems. Second, the LAHU is much less expensive to produce. The construction cost of the LAHU is 15% lower than a prior art separate office/laboratory air handlers.

The LAHU air handler is also versatile, in that by closing off vents 38, 46 and 47, the office and laboratory supply systems may be operated separately without returning any air from the office to the laboratory—just like the prior art systems.

Variations and modifications of the above described system will undoubtedly suggest themselves to those skilled in the art. Accordingly, the foregoing description should be taken as only illustrative rather than having any limiting effect on the following claims.

What is claimed is:

1. An air handling unit for use in a building having an office area and a laboratory area, the air handling unit comprising:
    an office air supply system which draws air from outside the building;
    a laboratory air supply system which draws air from outside the building wherein the office and laboratory air supply systems each have preheating and cooling systems; and
    an air return system which draws air from the office area for re-circulation through at least the laboratory air supply system upstream of the laboratory preheating and cooling systems and said re-circulated air also feeds into the laboratory air supply system downstream of the laboratory preheating and cooling systems.

2. The air handling unit of claim 1 wherein the office air supply system comprises a fan, a pressure sensor, and an air flow rate sensor.

3. The air handling unit of claim 1 wherein the laboratory air supply system comprises a fan, a pressure sensor, and an air flow rate sensor.

4. The air handling unit of claim 1 wherein the air return system comprises a fan, a pressure sensor, and an air flow rate sensor.

5. The air handling unit of claim 1 wherein the re-circulated air also feeds into the office air supply system upstream of the preheating and cooling systems.

6. An air handling unit for use in a building having an office area and a laboratory area, the air handling unit comprising:
    an office air supply system which draws air from outside the building;
    a laboratory air supply system which draws air from outside the building wherein the office and laboratory air supply systems each have preheating and cooling systems; and
    an air return system which draws air from the office area for re-circulation through at least the laboratory air supply system, and wherein the re-circulated air feeds into the laboratory air supply system downstream of the laboratory preheating and cooling systems.

7. The air handling unit of claim 6 wherein the re-circulated air also feeds into the office air supply system upstream of the office preheating and cooling systems.

8. The air handling unit of claim 6 wherein the office and laboratory preheating systems each comprise preheating coils, temperature sensors, and an air pressure differential sensor, and the office and laboratory cooling systems each comprise cooling coils and temperature sensors.

9. An air handling unit for use in a building having an office area and a laboratory area, the air handling unit comprising:
    an office air supply system which draws air from outside the building;
    a laboratory air supply system which draws air from outside the building; wherein the office and laboratory air supply systems each have preheating and cooling systems; and
    an air return system which draws air from the office area for re-circulation through at least the laboratory air supply system;
    said air handling unit further comprising a vented duct cross linking the office and laboratory air supply systems immediately downstream of the preheating and cooling coils of each system.

10. The air handling unit of claim 9 wherein the laboratory has a fume hood therein.

11. A method of handling air for use in an a building having both an office section and a laboratory section comprising the steps of:
    supplying outside air to the office section using an office supply system;
    supplying outside air to the laboratory section using a laboratory supply system;
    recirculating air from the office section by feeding at least the laboratory supply system;
    heating or cooling the air in both the office and laboratory supply systems depending on a sensed temperatures within each system; and
    cross linking the office and laboratory supply systems immediately downstream from the location in each system such that the air is heated or cooled.

12. The method of claim 11 including the additional step of using the return air from the office to modulate the supply air temperatures of both the office and laboratory sections by mixing the return air with the outside air supplied to the office and laboratory supply systems.

13. The method of claim 11 including the additional step of recirculating some of the air from the office to the office supply system.

14. The method of claim 11 with the additional step of operating a fume hood in the laboratory section.

* * * * *